United States Patent
Rothe

(10) Patent No.: US 10,059,188 B2
(45) Date of Patent: Aug. 28, 2018

(54) HYBRID VEHICLE

(71) Applicant: AUDI AG, Ingolstadt (DE)

(72) Inventor: Albrecht Rothe, Ingolstadt (DE)

(73) Assignee: Audi AG, Ingolstadt (DE)

( * ) Notice: Subject to any disclaimer, the term of this patent is extended or adjusted under 35 U.S.C. 154(b) by 5 days.

(21) Appl. No.: 15/355,831

(22) Filed: Nov. 18, 2016

(65) Prior Publication Data

US 2017/0144529 A1    May 25, 2017

(30) Foreign Application Priority Data

Nov. 21, 2015  (DE) .................. 10 2015 015 123

(51) Int. Cl.
| | |
|---|---|
| *B60K 6/24* | (2007.10) |
| *B60K 6/445* | (2007.10) |
| *B60K 6/26* | (2007.10) |
| *B60K 6/365* | (2007.10) |
| *B60K 6/54* | (2007.10) |
| *B60K 6/40* | (2007.10) |
| *B60K 6/36* | (2007.10) |

(Continued)

(52) U.S. Cl.
CPC ............ *B60K 6/445* (2013.01); *B60K 6/24* (2013.01); *B60K 6/26* (2013.01); *B60K 6/365* (2013.01); *B60K 6/40* (2013.01); *B60K 6/54* (2013.01); *B60K 6/36* (2013.01); *B60K 6/52* (2013.01); *B60K 2006/266* (2013.01); *B60K 2006/268* (2013.01); *B60K 2006/4808* (2013.01); *B60K 2006/4825* (2013.01); *B60Y 2200/92* (2013.01); *B60Y 2400/46* (2013.01); *Y02T 10/626* (2013.01); *Y02T 10/6252* (2013.01); *Y02T 10/6265* (2013.01); *Y10S 903/902* (2013.01)

(58) Field of Classification Search
None
See application file for complete search history.

(56) References Cited

U.S. PATENT DOCUMENTS

| | | |
|---|---|---|
| 2004/0173393 A1 | 9/2004 | Man et al. |
| 2007/0213162 A1 | 9/2007 | Takasaki |

(Continued)

FOREIGN PATENT DOCUMENTS

| | | |
|---|---|---|
| DE | 199 41 705 A1 | 3/2000 |
| DE | 100 01 436 A1 | 8/2000 |

(Continued)

OTHER PUBLICATIONS

European Search Report with respect to counterpart European patent application EP 16 19 8193, dated Apr. 5, 2017.

(Continued)

*Primary Examiner* — John D Walters
*Assistant Examiner* — Hilary L Johns
(74) *Attorney, Agent, or Firm* — Henry M. Feiereisen LLC

(57) ABSTRACT

A hybrid vehicle includes an engine compartment, and a drivetrain which includes a hybrid drive having a combustion engine and an electric motor arranged in side-by-side and axis-parallel relation in the engine compartment, when installed. A differential gear includes a gear shaft in driving connection with an motor shaft of the combustion engine, and a front-axle differential includes a differential pinion shaft. The electric motor is integrated in the drivetrain by drivingly connecting the electric motor via the differential pinion shaft, or by drivingly connecting the electric motor via a flywheel/clutch assembly.

5 Claims, 2 Drawing Sheets

(51) Int. Cl.
    *B60K 6/52*    (2007.10)
    *B60K 6/48*    (2007.10)

(56) References Cited

U.S. PATENT DOCUMENTS

| | | |
|---|---|---|
| 2010/0108414 A1 | 5/2010 | Kaltenbach |
| 2013/0199464 A1 | 8/2013 | Burr |
| 2014/0041483 A1* | 2/2014 | Glassner ................ B60K 6/387 74/665 A |

FOREIGN PATENT DOCUMENTS

| | | |
|---|---|---|
| DE | 201 18 908 U1 | 3/2002 |
| DE | 10 2008 043 341 A1 | 5/2010 |
| DE | 10 2010 046 048 A1 | 3/2012 |
| DE | 10 2013 100 880 A1 | 8/2013 |
| DE | 10 2013 111 148 A1 | 4/2015 |
| EP | 1 832 462 A1 | 9/2007 |
| EP | 2 762 338 A1 | 8/2014 |
| WO | WO 2005/095141 A1 | 10/2005 |
| WO | WO-2005095141 A1 * | 10/2005 ............. B60K 6/485 |
| WO | WO-2012042137 A1 * | 4/2012 ............... B60K 6/36 |

OTHER PUBLICATIONS

English translation of European Search Report with respect to counterpart European patent application EP 16 19 8193, dated Apr. 5, 2017.

* cited by examiner

HYBRID VEHICLE

CROSS-REFERENCES TO RELATED APPLICATIONS

This application claims the priority of German Patent Application, Serial No. 10 2015 015 123.1, filed Nov. 21, 2015, pursuant to 35 U.S.C. 119(a)-(d), the disclosure of which is incorporated herein by reference in its entirety as if fully set forth herein.

BACKGROUND OF THE INVENTION

The present invention relates to a hybrid vehicle.

The following discussion of related art is provided to assist the reader in understanding the advantages of the invention, and is not to be construed as an admission that this related art is prior art to this invention.

As environmental awareness increases and energy sources decrease in the future, the application of hybrid drive technology takes more and more center stage not only in the automobile industry. When using a hybrid drive comprised of a combustion engine and at least one electric motor, there is the challenge when it comes to optimally integrate the combustion engine and the electric motor in the drivetrain and to optimally use the available installation space. However, integration of an electric motor in such a hybrid drive is complex and cumbersome, especially when the electric motor is intended for attachment to further components of the drivetrain, such as a transmission, e.g. manual transmission, via complex assemblies, such as planetary gears. Normally, the attachment of the combustion engine and/or electric motor is realized via a clutch, e.g. shifting clutch. There is also the challenge to utilize the available tight space as effectively as possible in order to integrate an electric motor in a motor vehicle with combustion engine.

It would therefore be desirable and advantageous to address these problems and to obviate other prior art shortcomings.

SUMMARY OF THE INVENTION

According to one aspect of the present invention, a hybrid vehicle includes an engine compartment, and a drivetrain which includes a hybrid drive having a combustion engine and an electric motor arranged, when installed, in side-by-side and axis-parallel relationship in the engine compartment, a differential gear including a gear shaft in driving connection with an motor shaft of the combustion engine, and a front-axle differential including a differential pinion shaft, wherein the electric motor is integrated in the drivetrain by drivingly connecting the electric motor via the differential pinion shaft or by drivingly connecting the electric motor via a flywheel/clutch assembly.

A hybrid drive according to the present invention enables a synergistic attachment of the electric motor while using existing assemblies in the drivetrain and the available installation space in an optimal manner due to the axis-parallel arrangement of combustion engine and electric motor. The axis-parallel orientation of the combustion engine and the electric motor simplifies attachment of both components to further components of the drivetrain and permits use of constructively simple structural elements. As a result of the close placement of the electric motor to the combustion engine, components of the drivetrain can be used that are in close proximity of the combustion engine.

To ensure clarity, it is necessary to establish the definition of several important terms and expressions that will be used throughout this disclosure.

The term "hybrid drive" relates to a drive having at least two different drive technologies, i.e. several different drive units. A first drive unit may be a combustion engine, and a second drive unit may be an electric motor. When the hybrid drive is constructed in series, the drive power of only one of the drive units is transferred via the drivetrain directly onto a ground so as to propel the hybrid vehicle. The other drive unit provides merely power for use by the drive unit that powers the hybrid vehicle so as to propel the hybrid vehicle. It is, however, also conceivable to construct the hybrid drive in parallel so that both drive units provide power at the same time and in parallel for direct transfer onto the ground, i.e. for propelling the hybrid vehicle.

The term "drivetrain" of the hybrid drive relates to all components that generate the drive power in the hybrid drive and/or are involved in transferring the drive power onto the ground, for example a roadway.

The term "axis-parallel" arrangement of the combustion engine and the electric motor relates to a parallel arrangement of the respective motor shafts or output shafts, when viewed from above upon the hybrid vehicle, i.e. from the vehicle roof or hood. Thus, in a generic embodiment of an axis-parallel arrangement, the motor shafts may not be arranged in a literal sense in axis-parallel but appear parallel when viewed from above. In other words, the motor shafts of the combustion engine and the electric motor are arranged in skewed relation to one another but lie in imaginary parallel planes to one another. Thus, a rotation axis of the motor shaft of the combustion engine lies in a first plane, and a rotation axis of the motor shaft of the electric motor lies in a second plane, with the first plane and the second plane extending in parallel relation. The rotation axes are, however, oriented such as to be skewed in relation to one another.

The motor shafts of the combustion engine and the electric motor can be arranged three-dimensionally axis-parallel, i.e. axis-parallel in a literal sense, relative to one another. This is generally the case, unless described otherwise. The motor shafts may also be arranged parallel to the longitudinal axis of the hybrid vehicle.

The combustion engine and the electric motor are arranged side-by-side. In terms of their motor shafts or rotation axes, this means that the combustion engine and the electric motor overlap in axial direction. Thus, contrary to conventional wisdom, the combustion engine and the electric motor should not be arranged spaced-apart in axial direction, but rather arranged at at least one axial position side-by-side. Advantageously, the smaller one of the drive units, i.e. of the combustion engine and the electric motor, as viewed in axial direction should be completely overlapped by the greater one of the drive units in axial direction. For example, the electric motor is smaller in axial direction than the combustion engine. The term "motor shaft" relates hereby to the shaft of the combustion engine or electric motor, via which the drive power is substantially supplied to power the hybrid vehicle.

The afore-described arrangement of combustion engine and electric motor is implemented in the installed position, i.e. the final disposition of combustion engine and electric motor, once the hybrid vehicle has been assembled. The installation position is thus also established during travel of the hybrid vehicle, when the combustion engine and/or the electric motor generate(s) or provide(s) the drive power for propelling the hybrid vehicle.

According to another advantageous feature of the present invention, the electric motor can be arranged in relation to the motor shaft of the combustion engine on a side of a differential, advantageously a front-axle differential. In this way, free installation space can be used on the side of the differential or front-axle differential for installation and positioning of the electric motor, in particular on the right-hand side.

The term "differential" relates in this context substantially to a gear mechanism having a driveshaft or input shaft, and two driven shafts or output shafts. The term "front-axle differential" relates to a differential used to drive at least a front axle of the hybrid vehicle or at least a front wheel. For example, the electric motor is arranged on a right-hand side in relation to a longitudinal center axis of the hybrid vehicle in forward travel direction.

The electric motor can be drivingly connected in the drivetrain via the differential pinion shaft of a differential gear, especially of the front-axle differential. In this way, the need for additional complex assemblies for attachment of the electric motor to further components of the drivetrain can be eliminated because the attachment can be realized via attachment elements, such as gearwheels or the like. When the electric motor is additionally arranged in axis-parallel relation to the combustion engine and on the side of the respective differential, the attachment can be implemented over a relatively short distance, so that construction costs are further reduced and tolerance guidelines can be simplified. For example, there is no need for a structurally complex gear extension.

In addition, the wheel-proximal attachment of the electric motor to the further components of the drivetrain is especially efficient in terms of the electric drive and recuperation. Gear functions can be designed regardless of the aforementioned operating states of the electric motor. Furthermore, shift operations of the electric motor can be used in shifting pauses as power filler or torque filler, without impacting the gear function during shifting operation.

The term "differential gear" relates to a gear mechanism which has integrated therein a differential. Such a differential gear has a differential pinion shaft via which the drive power can be transferred to the respective differential. The differential may be part of a componentry of the differential gear, i.e. integrated therein.

According to another advantageous feature of the present invention, the electric motor can be attached in driving connection to a spur gear stage of the differential pinion shaft. Advantageously, when using the gearwheel of the differential pinion shaft, the attachment of the electric motor to the further components of the drivetrain can be realized jointly with structural elements that already are part of a differential gear. The need for further complex structural elements or assemblies for attachment of the electric motor to further components of the drivetrain can thus advantageously be eliminated. In addition, the attachment of the electric motor to the differential pinion shaft enables a functional decoupling of the electric motor from the differential gear.

The term "gearwheel" of the differential pinion shaft in this context relates to a gearwheel or similar driving attachment element, which is arranged on the differential pinion shaft at an end which is opposite to the differential. The gearwheel forms a gear stage, in particular jointly with a further gearwheel. The gearwheels can be part of the differential gear.

According to another advantageous feature of the present invention, the electric motor can be arranged in relation to the motor shaft of the combustion engine on a side of a starter generator configured to start the combustion engine. As a result, available installation space can be used so that packaging in the engine compartment can be carried out in a simple manner, even when adding an electric motor. The term "starter generator" relates in this context to an electric motor by which the combustion engine can be started. Such a starter generator may be configured as a belt-type starter generator. The electric motor may be arranged on the left-hand side in relation to the longitudinal center axis of the hybrid vehicle in forward travel direction.

The electric motor can also be drivingly connected via a flywheel/clutch assembly in the drivetrain. Such an integration of the electric motor in the drivetrain eliminates the need for additional complex componentries, since the flywheel/clutch assembly typically includes attachment elements that can be used to integrate the electric motor in the drivetrain.

The electric motor can further be placed in the drivetrain close to the combustion engine, so that the relevant components of the drivetrain can be sized for the high power input generated by the electric motor, especially when the electric motor provides the drive power. A placement near the power input site of the combustion engine is especially efficient both in the operating state of the electric drive and the recuperation. The coupling function of the flywheel/clutch assembly also enables a functional separation of the combustion engine from the electric motor, so that the functions of the electric motor can be established separate and decoupled from the operating state of the combustion engine.

The term flywheel/clutch assembly relates in this context to a componentry having at least one flywheel and at least one clutch. The clutch assumes hereby the function to engage or disengage the combustion engine in the drivetrain. It is also conceivable to configure the flywheel as dual mass flywheel so as to enable a more even introduction of drive energy from the combustion engine into the drivetrain.

According to another advantageous feature of the present invention, the electric motor can be attached in driving connection to a clutch cage of the flywheel/clutch assembly. As a result, an already existing structural element can be used or, optionally, easily modified, so that the need for further more complex componentries for integrating the electric motor into the drivetrain is eliminated. Depending on the type of clutch being used, the electric motor can be integrated such that the electric motor remains connected with the drivetrain or further components, even when the clutch is disengaged, so that the hybrid vehicle can be powered by the electric motor, when the combustion engine is turned off or decoupled.

According to another advantageous feature of the present invention, the electric motor can be attached in driving connection to a flywheel of the flywheel/clutch assembly. As a result, the electric motor can be integrated in the drivetrain without using further more complex componentries, such as, e.g., a toothed belt.

According to another advantageous feature of the present invention, the electric motor can be configured to start the combustion engine. By using the electric motor as starter generator, the need for a separate or initially existing starter generator for starting the combustion engine can be eliminated. The electric motor can thus be placed in a cleared installation space and positioned at least in part in the region of the initially existing starter generator.

According to another advantageous feature of the present invention, an attachment element can be constructed in the form of a planetary gear, with the electric motor being attached via the attachment element in driving connection to the differential pinion shaft of the drivetrain or to the flywheel/clutch assembly of the drivetrain. By using a planetary gear, the integration of the electric motor in the drivetrain provides more design options and/or more functional options. Through the presence of a planetary gear, the rotation speed of the electric motor can be better suited to at least a propelled wheel. It is hereby also conceivable to drivingly connect the electric motor to several components of the drivetrain.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
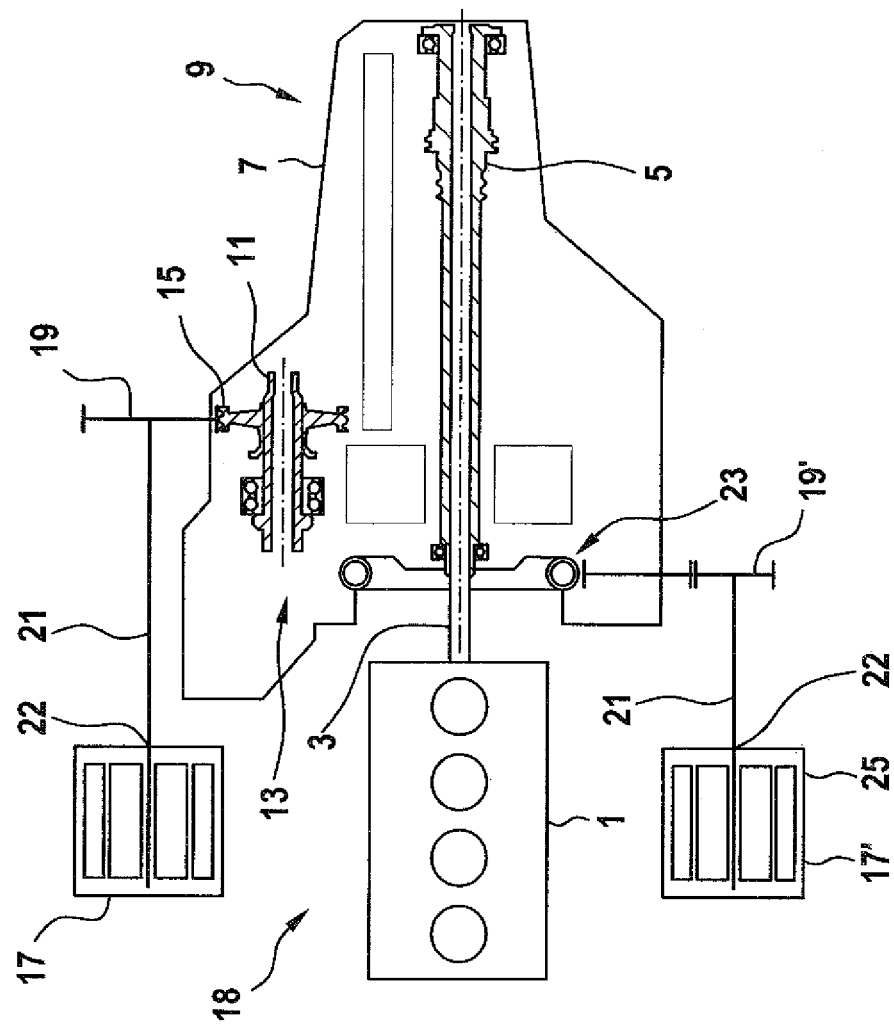
FIG. 1 is a schematic illustration of a hybrid drive according to the present invention with a differential gear connected to a combustion engine, and an electric motor which is selectively linked to the drivetrain via the differential gear and/or via a flywheel/clutch assembly.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a hybrid drive according to the present invention, generally designated by reference numeral 18 and including a combustion engine 1 having an motor shaft 3 drivingly connected with a gear shaft 5 of a differential gear 7. The differential gear 7 can be provided with a manual transmission 9 for shifting into the various gears. In addition, the differential gear 7 includes a differential pinion shaft 11 for driving a differential 13. The differential pinion shaft 11 has a spur gear stage 15 to drive the differential pinion gear 11 via the manual transmission 9 for example. The hybrid drive 18 includes at least one electric motor 17 or 17'.

FIG. 1 illustrates by way of example in the upper half thereof a possible embodiment of the electric motor 17 which can be drivingly connected to the differential pinion shaft 11, in particular via a spur gear stage 15. The connection of the electric motor 17 to the differential pinion shaft 11 is hereby realized via an attachment element 19, e.g. a gearwheel. Although not shown in detail, the attachment element 19 may also be constructed as a planetary gear to provide more design options and functional options. The electric motor 17 has a motor shaft 21 and a drive 22, mounted on the motor shaft 21, so that the electric motor 17 can be drivingly connected via the drive 22 to the attachment element 19.

To optimize the use of the available installation space, the electric motor 17 and the combustion engine 1 are arranged such that the motor shaft 3 and the motor shaft 21, as viewed from above from a direction of a roof or hood, extend in parallel relationship. It is, however, also conceivable to arrange the motor shaft 3 and the motor shaft 21 in substantial three-dimensional parallel relationship.

The combustion engine 1 is further provided with a flywheel/clutch assembly 23, via which the combustion engine 1 can be connected to or disconnected from the gear shaft 5. In addition, the combustion engine 1 may also be started via the flywheel/clutch assembly 23.

FIG. 1 illustrates by way of example in the lower half thereof a possible embodiment of the electric motor 17' which is drivingly connected to the flywheel/clutch assembly 23 via an attachment element 19'. The electric motor 17' may hereby assume also the function of a stator generator 25 to eliminate the need for a separate starter generator so that the thus available space for installation of the electric motor 17' can be used.

The attachment element 19' is constructed here, by way of example, as planetary gear. It is, of course, also conceivable to integrate the electric motor 17' via its drive 22 to the flywheel/clutch assembly 23 via a gearwheel, V-belt, toothed belt, or the like.

To optimize use of the available installation space, the electric motor 17' and the combustion engine 1 are also arranged such that the motor shaft 3 and the motor shaft 21, as viewed from above from a direction of a roof or hood, extend in parallel relationship. It is, however, also conceivable to arranged the motor shaft 3 and the motor shaft 21 in substantial three-dimensional parallel relationship.

Figure 2:
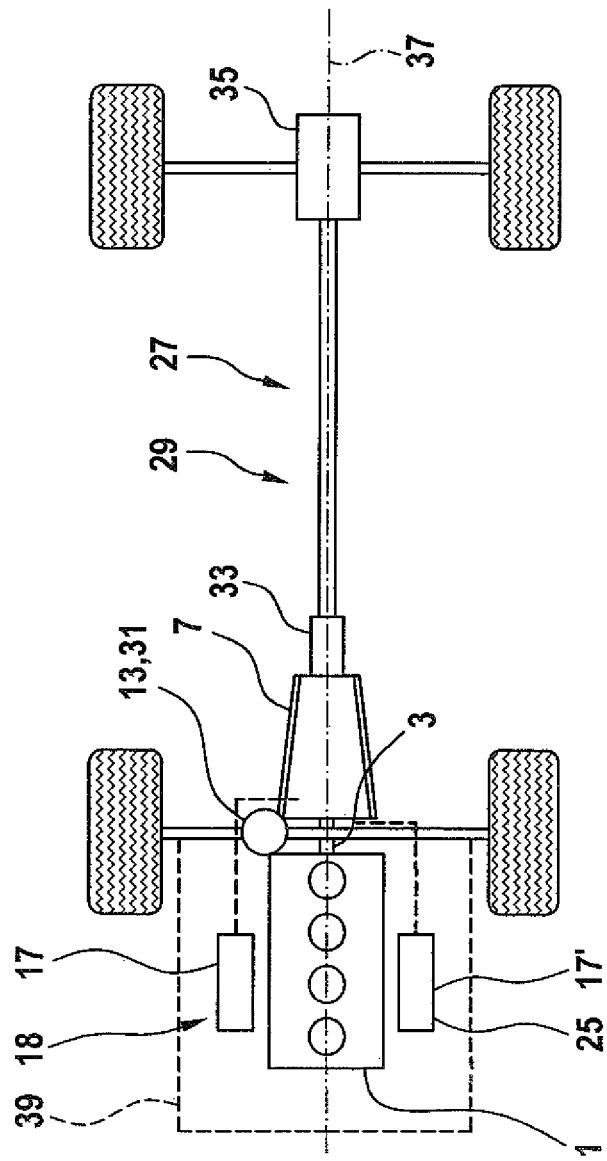
FIG. 2 is a schematic illustration of a hybrid vehicle with a drivetrain comprised of at least one combustion engine, a differential gear, and an electric motor.

Referring now to FIG. 2, there is shown a schematic illustration of a hybrid vehicle, generally designated by reference numeral 27 and having a drivetrain, generally designated by reference numeral 29. The drivetrain 29 includes the combustion engine 1, electric motor 17 or 17', differential gear 7, a front-axle differential 31 and, optionally, a gear-side manual transmission 33, e.g. delivery truck manual transmission. In addition, a rear-axle differential 35 is also arranged in the drivetrain 29. The combustion engine 1 is hereby in driving connection via the motor shaft 3 with the differential gear 7.

The electric motor 17 is arranged in forward travel direction on the right-hand side in relation to a longitudinal center axis 37 of the hybrid vehicle 29 in a region of the differential 13 and the front-axle differential 3t As a result, the attachment of the electric motor 17 to the differential gear 7 is simplified since the attachment of the electric motor 17 can be established via the differential pinion shaft 11 and advantageously via the spur gear stage 15 of the differential pinion shaft 11, and thus can be realized via a short distance.

The electric motor 17' can be arranged in forward travel direction on the left-hand side in relation to the longitudinal center axis 37 of the hybrid vehicle 29 in a region which normally is provided for a starter generator but has now been eliminated by using the electric motor 17' to start the combustion engine 1. As described above, the connection of the electric motor 17' in the drivetrain 29 is hereby realized via the flywheel/clutch assembly 23, as shown in FIG. 1.

The combustion engine 1 and the electric motor 17 or 17' are arranged in side-by-side and axis-parallel relation so that at least when viewed from above onto an engine compartment 29 from the roof or hood, the motor shaft 3 and the motor shaft 21 are arranged parallel to one another.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A hybrid vehicle, comprising:
   an engine compartment; and
   a drivetrain comprising:
   a hybrid drive which includes a combustion engine and an electric motor arranged, when installed, in side-by-side and axis-parallel relation in the engine compartment,
   a differential gear including a gear shaft in surrounding coaxial relation to and in driving connection with a motor shaft of the combustion engine, and
   a front-axle differential including a differential pinion shaft,
   wherein the electric motor is drivingly connected to the differential pinion shaft for transfer of a drive power or decoupling of the electric motor from the differential gear.

2. The hybrid vehicle of claim 1, wherein the electric motor is arranged in relation to the motor shaft of the combustion engine on a side of the front-axle differential.

3. The hybrid vehicle of claim 1, wherein the electric motor is attached in driving connection to a spur gear stage of the differential pinion shaft.

4. The hybrid vehicle of claim 1, further comprising an attachment element constructed in the form of a planetary gear to attach electric motor in driving connection to the differential pinion shaft of the drivetrain.

5. The hybrid vehicle of claim 1, further comprising a starter generator configured to start the combustion engine, said electric motor being arranged in relation to the motor shaft of the combustion engine on a side of the starter generator.

* * * * *